United States Patent
Uppala et al.

(10) Patent No.: US 8,180,323 B2
(45) Date of Patent: May 15, 2012

(54) NON CENTRALIZED SECURITY FUNCTION FOR A RADIO INTERFACE

(75) Inventors: Subramanya Ravikanth Uppala, W. Marredpally (IN); Rama Moorthy Kuvethanda, Bangalore (IN); Brajabasi Padhy, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 922 days.

(21) Appl. No.: 11/733,015

(22) Filed: Apr. 9, 2007

(65) Prior Publication Data

US 2008/0247368 A1 Oct. 9, 2008

(51) Int. Cl.
*H04M 1/66* (2006.01)

(52) U.S. Cl. ........ 455/411; 380/247; 380/248; 380/249; 380/250

(58) Field of Classification Search .................. 370/331, 370/338, 254; 380/273, 247–250; 713/182, 713/168; 726/1; 455/411
See application file for complete search history.

(56) References Cited

U.S. PATENT DOCUMENTS

| | | | | |
|---|---|---|---|---|
| 7,350,077 | B2 * | 3/2008 | Meier et al. | 713/171 |
| 7,469,139 | B2 * | 12/2008 | van de Groenendaal | 455/411 |
| 7,477,746 | B2 * | 1/2009 | Kang et al. | 380/270 |
| 2004/0208151 | A1 * | 10/2004 | Haverinen et al. | 370/338 |
| 2004/0214539 | A1 * | 10/2004 | Rajamani et al. | 455/161.1 |
| 2005/0060319 | A1 * | 3/2005 | Douglas et al. | 707/10 |
| 2005/0243769 | A1 * | 11/2005 | Walker et al. | 370/331 |
| 2005/0260973 | A1 * | 11/2005 | van de Groenendaal | 455/411 |
| 2005/0260996 | A1 * | 11/2005 | Groenendaal | 455/445 |
| 2005/0286480 | A1 * | 12/2005 | Akiyama | 370/338 |
| 2006/0067272 | A1 * | 3/2006 | Wang et al. | 370/331 |
| 2006/0200678 | A1 * | 9/2006 | Yamada et al. | 713/182 |
| 2008/0031155 | A1 * | 2/2008 | Korus et al. | 370/254 |
| 2008/0123852 | A1 * | 5/2008 | Jiang | 380/273 |
| 2008/0295144 | A1 * | 11/2008 | Cam-Winget et al. | 726/1 |

OTHER PUBLICATIONS

IEEE Std. 802.11i-2004, Part 11: Wireless LAN Medium Access Control (MAC) and PhysicalLayer (PHY) Specifications. Amendment 6: Medium Access Control (MAC) Security Enhancements, Jul. 2004.*

* cited by examiner

*Primary Examiner* — Jean A Gelin
*Assistant Examiner* — Nathan Taylor (57) ABSTRACT

A module dual mode device architecture and method of use is disclosed. The system architecture provides a distributed design of an IEEE 802.11i compliant supplicant module that provides security to data/voice packets sent over the wireless local area network ("WLAN") radio interface from a dual mode device to an access point. The dual mode device establishes a connection with the access point and if the access point is security enabled, one or more session keys are generated. The session keys are used to provide security for communications over the radio interface between the dual mode device and the access point.

19 Claims, 5 Drawing Sheets

NON CENTRALIZED SECURITY FUNCTION FOR A RADIO INTERFACE

FIELD OF THE INVENTION

The present invention generally relates to wireless communication and more particularly relates to improved security for voice over internet protocol ("VoIP") calls using a wireless fidelity ("WIFI") interface on a wireless communication device.

BACKGROUND

As dual mode voice/data devices emerge, there is a need to provide security to voice calls over the data interface that is similar to the security provided to voice calls over the voice interface. In conventional wireless internet protocol ("IP") communications, security is typically multi layered. The wireless air interface is protected as per the IEEE 802.11i specification and end-to-end security can be provided using IPSec.

One particular problem with conventional dual mode devices is that implementations of the supplicant module on such devices, which provides for encryption and decryption of data over the wireless link between the dual mode device and the data network access point ("AP"), are integrated with the WIFI management functionality on the dual mode device. This integrated approach has created a need in the market for a dual mode device with a voice over IP ("VoIP") solution that is more flexible and can employ the various modules provided by different software vendors that develop the critical modules required for IEEE 802.11i security.

SUMMARY

A module dual mode device architecture and method of use is disclosed. The system architecture provides a unique distributed design of an IEEE 802.11i compliant supplicant module that provides security to data/voice packets sent over the wireless local area network ("WLAN") radio interface from a dual mode device to an access point.

The dual mode device establishes a connection with the access point and if the access point is security enabled, one or more session keys are generated. The session keys are used to provide security for communications over the radio interface between the dual mode device and the access point. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a dual mode device with a distributed architecture capable of implementing non centralized security for communications over the radio interface with a WLAN. For example, one method as disclosed herein allows for the dual mode device to establish a connection with the access point and generate one or more session keys if the access point is security enabled. The session keys are then used to provide security for communications over the radio interface between the dual mode device and the access point.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
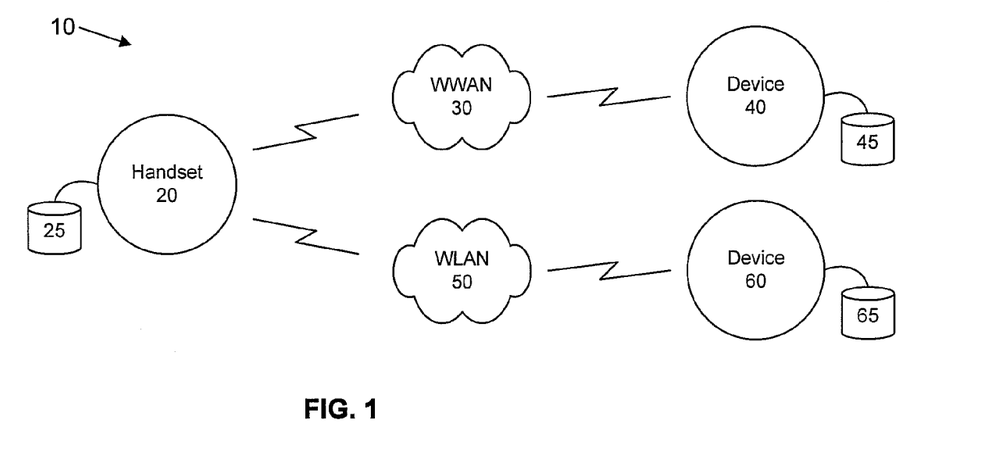
FIG. 1 is a network diagram illustrating an example dual mode device in communication over a wireless wide area network ("WWAN") and a wireless local area network ("WLAN") according to an embodiment of the present invention.

FIG. 1 is a network diagram illustrating an example dual mode device in communication over a wireless wide area network ("WWAN") and a wireless local area network ("WLAN") according to an embodiment of the present invention. In the illustrated embodiment, the system 10 comprises a dual mode wireless communication device 20 (also referred to herein as a handset), a WWAN 30, a WLAN 50, and a two network devices 40 and 60, respectively. The handset 20 and each of the network devices 40 and 60 are configured with respective data storage areas 25, 45, and 65.

The handset 20 is communicatively coupled with both the WWAN 30 and the WLAN 50. The WWAN 30 is configured for voice and data communications (e.g., with device 40) over a wide geographical area, for example using the code division multiple access ("CDMA") communication scheme. The WLAN 50 is configured for voice and data communications (e.g., with device 60) over a more limited geographical area, for example using one or more of the IEEE 802 communication standards such as 802.11a/b/g. The WWAN 30 or the WLAN 50 can also be communicatively coupled with a public or private network (not shown), which may include that particular aggregation of networks commonly known as the Internet.

The handset 20 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network such as WWAN 30 and WLAN 50.

The data storage areas 25, 45, and 65 can be any sort of internal or external memory device and may include both persistent and volatile memories. The function of the respective data storage areas 25, 45, and 65 is to maintain data for long term storage and also to provide efficient and fast access to instructions for applications that are executed by the respective devices.

Figure 2:
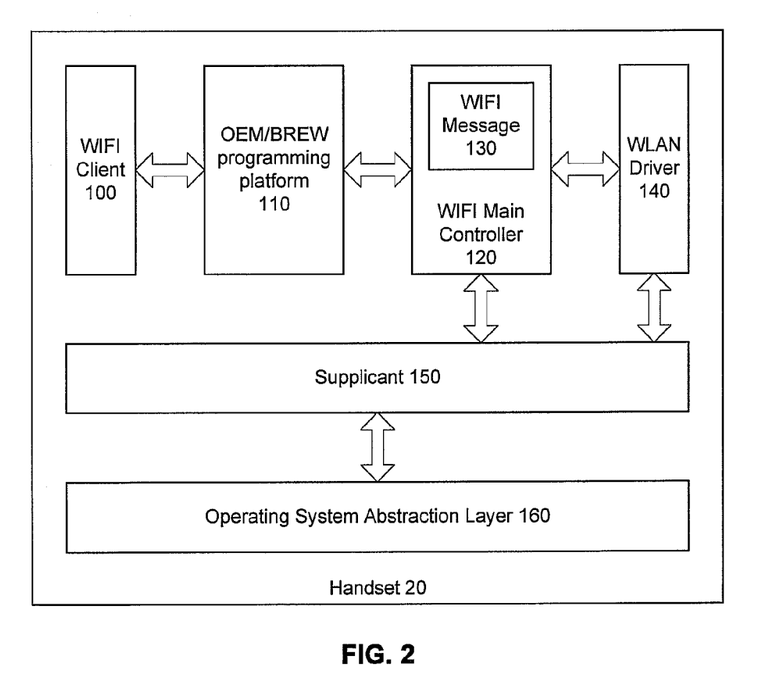
FIG. 2 is a block diagram illustrating an example dual mode device according to an embodiment of the present invention.

FIG. 2 is a block diagram illustrating an example dual mode device 20 according to an embodiment of the present invention. In the illustrated embodiment, the handset 20 comprises a WIFI client module 100, an OEM/BREW programming platform module 110, a WIFI main controller module 120 that supports a WIFI message module 130, a WLAN driver module 140, a supplicant module 150, and an operating system abstraction layer ("OSAL") module 160. These various modules in the handset 20 can be implemented in software, hardware, or some combination of the two and are in communication with each other directly or indirectly through various inter-module interfaces.

The WIFI client module 100 is configured to determine availability of access to a WIFI network (e.g., a WLAN) and facilitate and control such access through authentication and association with access points. The WIFI client module 100 additionally maintains WIFI profiles in a data storage area to facilitate communication with various access points and manages configuration information for the supplicant module 150 and triggers the supplicant module 150 when an access point is capable of secure communications.

The OEM/BREW programming platform module 110 provides a programming platform for third party developers to create applications for execution on the handset 20. The WIFI main controller module 120 is configured to facilitate communication between the supplicant module 150 and other modules such as the WIFI client 100. The WIFI message module 130 is configured to encode and decode WLAN messages to and from the WLAN card via the WLAN driver 140. In one embodiment, the WIFI message module 130 provides the session key information to the WLAN firmware. The WLAN driver module 140 is configured to communication with the radio interface, e.g., the WLAN card, and provides the interface for communication with the radio interface hardware. The OSAL module 160 is configured to abstract the services of the operating system on the handset 20 so that third party software modules (e.g., those facilitated by the OEM/BREW programming platform module 110) can be more easily integrated.

The supplicant module 150 is configured to generate the session keys needed for encryption and decryption of data for secure communications over the radio interface (i.e., the wireless link) between the handset 20 and an access point. The supplicant module 150 is configured to generate a variety of session keys, including pairwise transit keys, group temporal keys, traffic protection keys, master session keys, or any other temporary encryption keys that can be used between the access point and the handset 20 for securing communications during a session. Other types of session keys can also be generated by the supplicant module 150, as will be understood by those having skill in the art.

In one embodiment the supplicant module 150 is also configured to perform authentication in accordance with one or more of the IEEE 802.1x communication standards as necessary. The supplicant module 150 is also configured to perform four way handshaking to generate the session keys or alternatively two way handshaking (in the case where the interim WPA security is used) to generate the session keys. The supplicant module 150 is also configured to implement timers and other features and requirements of the IEEE 802.11i supplicant specification. The supplicant module 150 is also configured to install the generated session keys in the WLAN card (e.g., the radio interface) and inform the WIFI client module 100 that the session keys have been generated and are installed on the WLAN card and ready for use in secure communications.

Importantly, the functionality of the supplicant module 150 is logically separated from the functionality of the WIFI client module 100 to advantageously enable handset manufacturers or enhancers to employ various modules created by various third parties in a fashion that allows all such modules to work together in an 802.11i compliant fashion. Thus, the architecture of the handset 20 separates the WLAN management functions and the IEEE 802.11i security functions such that WLAN management is handled by the WIFI client module 100 and the security functions are handled by the supplicant module 150.

Figure 3A:
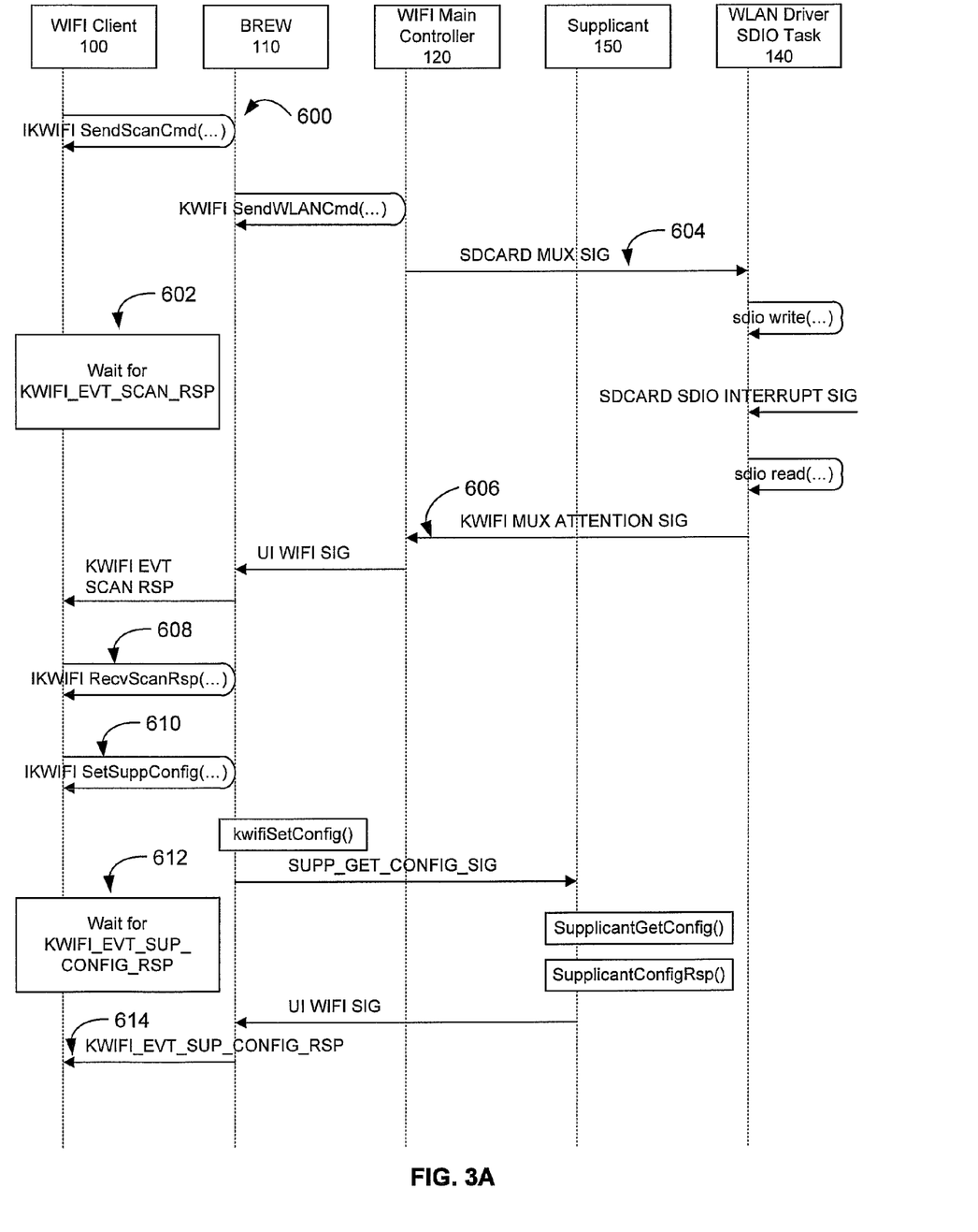
FIGS. 3A-3C are communication flow diagrams illustrating example interactions between modules in a dual mode device according to an embodiment of the present invention.
Figure 3B:
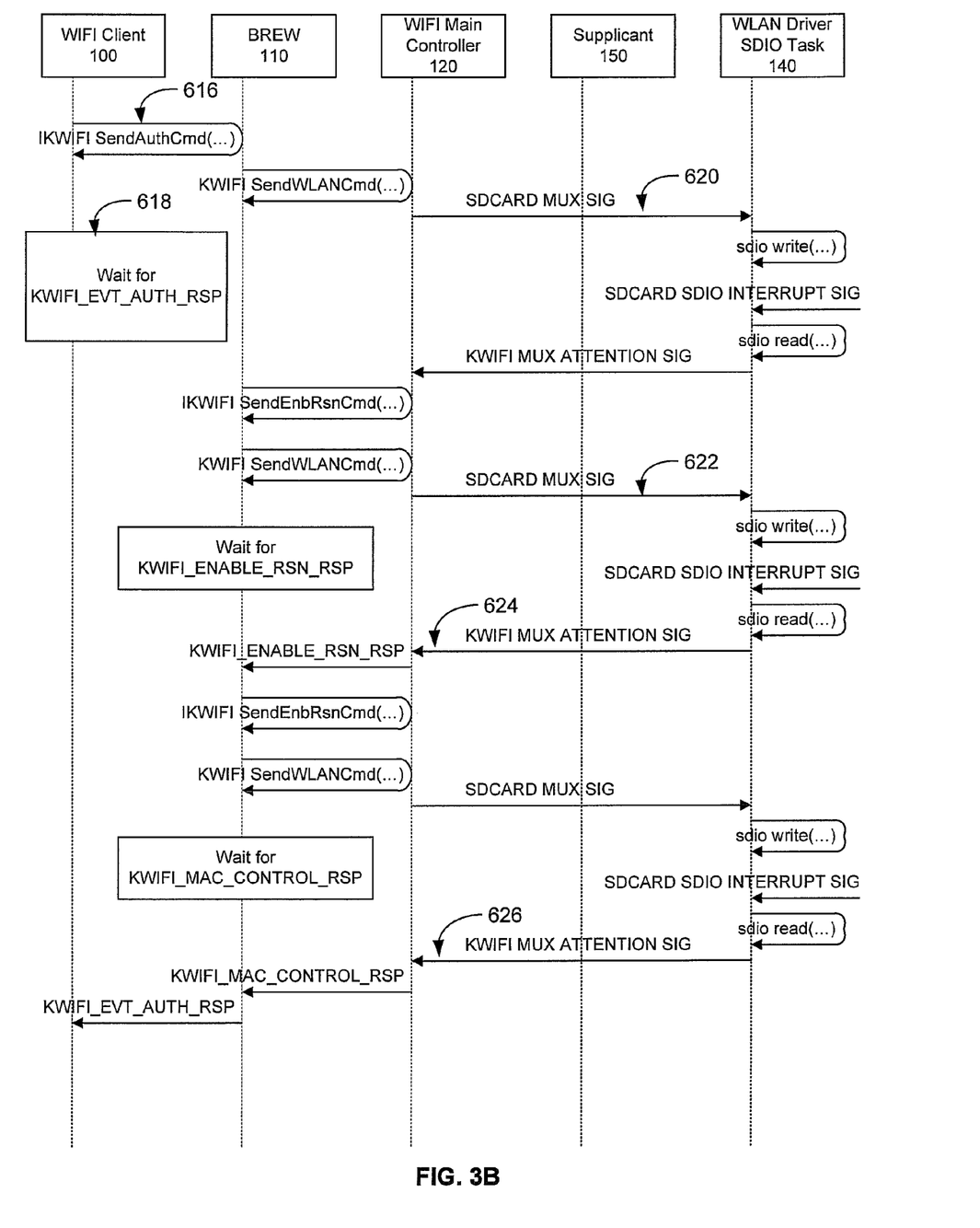
Figure 3C:
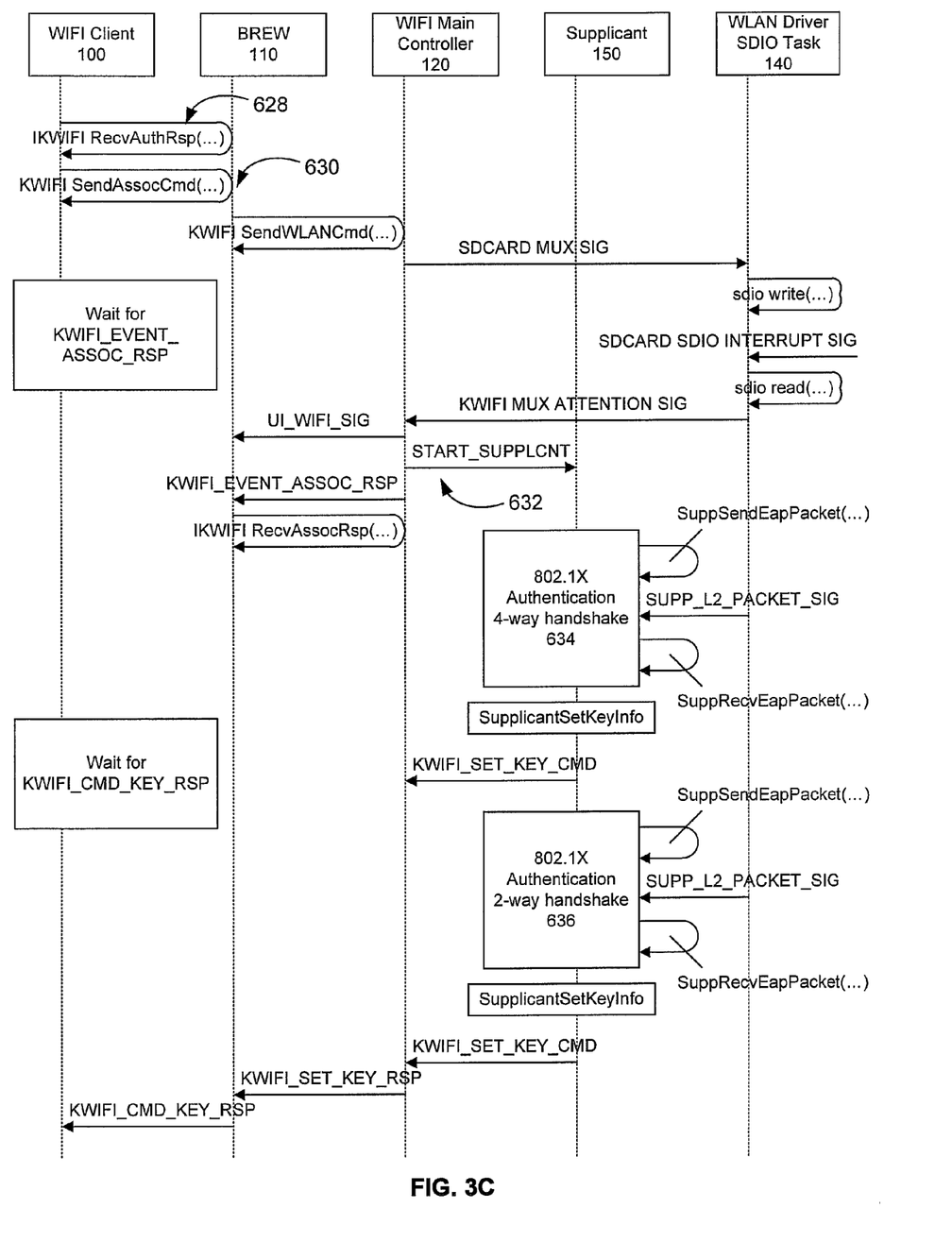

FIG. 3A-3C are communication flow diagrams illustrating example interactions between modules in a dual mode device according to an embodiment of the present invention. In the illustrated embodiment, the interactions between the modules are shown by way of example only and reflect one possible implementation of the interaction between the various modules. Alternative embodiments may have different modules that may interact differently to carry out the same functionality that is broadly contemplated by the invention. As will be understood by those having skill in the art, the division of functional responsibilities between the WIFI client module 100 and the supplicant module 150 are clearly separate and compliance with standards such as IEEE 802.11i is managed by the interaction between the combined modules.

The WIFI client module 100 is a BREW client where the user can scan for APs. The OEM/BREW programming platform module 110 represents the BREW layer. The WIFI main controller module 120 includes core software. The WLAN driver module 140 is a WLAN card that has WLAN driver software. The communication flow diagrams of FIGS. 3A-3C can be considered as a single logical communication flow.

Turning now to FIG. 3A, the WIFI client module 100 sends a scan command (probe request) 600 and enters a wait state 602, wherein the WIFI client module 100 waits for a response from the core software in the WIFI main controller module 120. The core software in the WIFI main controller module 120 forwards the scan command (probe request) 604 to the WLAN driver module 140. The WLAN driver module 140 sends a response 606. The core software in the WIFI main controller module 120 receives the response 606. Upon receiving the response 606 at the core software in the WIFI main controller module 120, it forwards the response to the WIFI client module 100. The WIFI client module 100 receives the response 608.

Next, the WIFI client module 100 sends supplicant configuration information 610 to the supplicant module 150. The supplicant configuration information 610 can be a passphrase, for example. The WIFI client module 100 enters a wait state 612, wherein the WIFI client module 100 waits for a response from the supplicant module 150. The supplicant module 150 receives the supplicant configuration information 610 and sends a supplicant configuration response 614 back to the WIFI client module 100.

Turning now to FIG. 3B, after the WIFI client module 100 receives the supplicant configuration response 614, it sends an authentication command 616 to the core software in the WIFI main controller module 120. Thereafter, the WIFI client module 100 enters a wait state 618 wherein the WIFI client module 100 waits for a response from the core software in the WIFI main controller module 120. Once the core software in the WIFI main controller module 120 receives the authentication command 616, it sends a robust secure network ("RSN") command 620 and a message authentication code ("MAC") command 622 to the WLAN driver module 140. The WLAN driver module 140 returns responses 624 and 626 to the core software in the WIFI main controller module 120.

Turning now to FIG. 3C, after the WLAN driver module returns responses 624 and 626 to the core software in the WIFI main controller module 120, the core software in the WIFI main controller module 120 sends an authentication response 628 to the WIFI client module 100. After the WIFI client module 100 receives the authentication response 628, it sends an association request 630 to the core software in the WIFI main controller module 120.

When the core software in the WIFI main controller module 120 receives the association request 630, it triggers supplicant activity by setting a signal 632 to the supplicant module 150. When the supplicant module 150 receives the signal 632, it sends an extensible authentication protocol ("EAP") start packet. A task in the supplicant module 150 receives the EAP start packet and performs a 4-way handshake 634 and a 2-way handshake 636. After performing the 4-way handshake 634 and the 2-way handshake 636, the supplicant module 150 installs a PTK (Pairwise) key and a GTK (Groupwise) key to the WLAN driver module 140.

Figure 4:
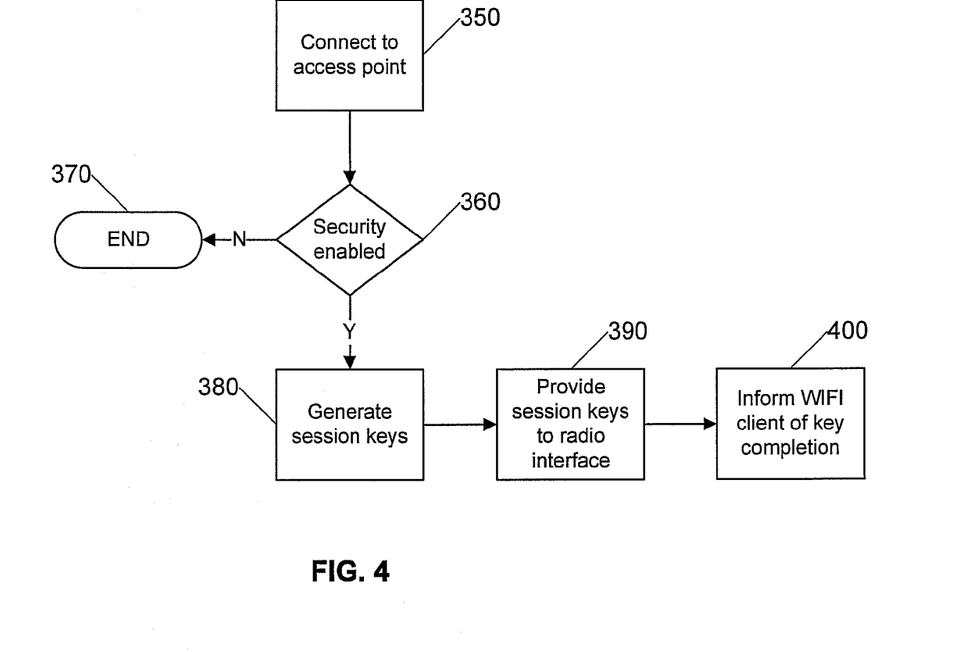
FIG. 4 is a flow diagram illustrating an example process for secure communications over a radio interface according to an embodiment of the present invention.

FIG. 4 is a flow diagram illustrating an example process for secure communications over a radio interface according to an embodiment of the present invention. The illustrated process can be carried out by a dual mode device such as the handset previously described with respect to FIG. 2. Initially, in step 350 the handset connects to the WIFI network. This connection uses the radio interface of the handset and establishes a communication link between the handset and an access point that provides access to a WLAN. The connection may be made on behalf of an application running on the handset, for example a VoIP application.

Once the connection between the handset and the access point is established using the radio interface on the handset, in step 360 the handset determines if the access point is configured for secure communications in accordance with the IEEE 802.11i standard. For example, an AP that is WIFI protected access ("WPA") or WPA2 enabled is configured for secure communications. On the other hand, an AP that is non-secure or employs the very weak wired equivalency privacy ("WEP") security that does not include the concept of session keys is considered to be not configured for secure communications. Accordingly, as determined in step 360, if the AP is not configured for secure communications then the process ends in step 370 and secure communications are not used. If, however, the AP is configured for secure communications then in step 380 the handset generates one or more session keys for use in the secure communications.

For example, the session keys that are generated may include a pairwise transit key, group temporal key, traffic protection key, master session key, or any other temporary encryption key to be used between the AP and the handset for the limited duration of a single session. Once the session keys are generated, in step 390 they are provided to the radio interface module, for example, a WLAN driver module for the WLAN card or the session keys are installed on the WLAN card for use in secure communications. Additionally, in step 400 the WIFI client module is informed about the creation of the session keys and propagation of the session keys to the radio interface module such that the WIFI client module is configured for secure communications. Accordingly, the session keys are then employed to facilitate secure communications between the handset and the AP over the radio interface.

Figure 5:
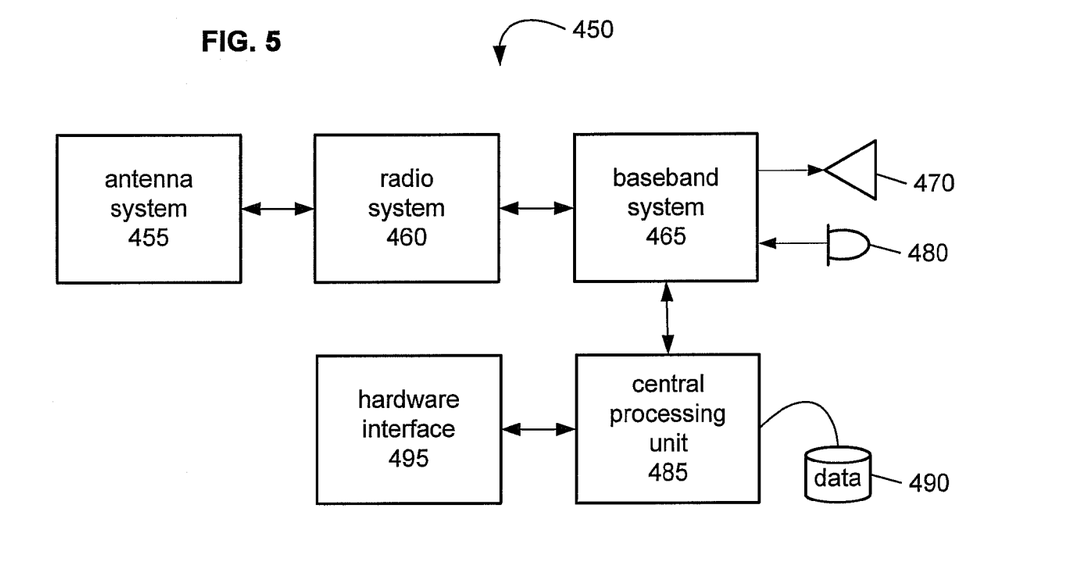
FIG. 5 is a block diagram illustrating an example wireless communication device that may be used in connection with various embodiments described herein.

FIG. 5 is a block diagram illustrating an example wireless communication device 450 that may be used in connection with various embodiments described herein. As will be clear to those skilled in the art, other wireless communication devices and/or architectures may also be used.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIG. 2.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device configured for secure communications with an access point communicatively coupled with a wireless local area network, the wireless communication device comprising:
   a computer readable storage device for storing computer executable programmed modules;
   a processor communicatively coupled with a computer readable storage device for executing programmed modules stored therein, each module being either directly or indirectly in communication with the other modules either directly or indirectly through one or more inter-module interfaces, wherein each module comprises separate executable program code for performing a specific set of one or more functions;
   a radio interface module configured to enable wireless communications;
   a wireless fidelity (WIFI) client module configured to
      identify an access point,
      establish communication with said access point via the radio interface,
      determine the capability of the access point for secure communications, and,
      based on a determination that the access point is capable of secure communications, instruct a supplicant module to generate one or more session keys; and
   the supplicant module configured to
      implement wireless communication security in accordance with the determined capability of the access point and where said determined capability includes IEEE 802.11i security,
      generate the one or more session keys for use in secure communications with the access point, and
      provide the one or more session keys to the radio interface module.

2. The device of claim 1, wherein the one or more session keys comprise a pairwise transmit key.

3. The device of claim 1, wherein the one or more session keys comprise a group temporal key.

4. The device of claim 1, further comprising a data storage area, wherein the WIFI client module is further configured to store one or more WIFI communication profiles in the data storage area.

5. The device of claim 1, wherein the supplicant module is further configured to perform authentication in accordance with an IEEE 802 communication standard.

6. The device of claim 1, wherein the supplicant module is further configured to implement a timer in accordance with an IEEE 802.11i communication standard.

7. The device of claim 1, wherein the supplicant module is further configured to perform a four way handshake to generate the one or more session keys.

8. The device of claim 1, wherein the supplicant module is further configured to perform a two way handshake to generate the one or more session keys.

9. A method for non centralized security over a radio interface of a wireless communication device that includes executable programmed modules stored in a computer readable storage device, each module being either directly or indirectly in communication with the other modules either directly or indirectly through one or more inter-module interfaces, each module comprising separate executable program code for performing a specific set of one or more functions, wherein a microprocessor is used to perform the steps comprising:

by a wireless fidelity (WIFI) client module,
establishing a connection via the radio interface with an access point communicatively coupled with a communication network,
determining that the access point is security enabled,
determining that the access point is capable of secure communications in accordance with an IEEE 802.11i communication standard, and,
based on the determination that the access point is capable of secure communications in accordance with the IEEE 802.11i communication standard, triggering a supplicant module which is separate from the WIFI client module; and, by the supplicant module,
obtaining session key generation information,
generating one or more session keys configured to govern secure communications over the radio interface, and
providing said one or more session keys to the radio interface using a main controller module for use in secure communications between the wireless communication device and the access point.

10. The method of claim 9, wherein the generating step further comprises performing a four way handshake.

11. The method of claim 9, wherein the generating step further comprises performing a two way handshake.

12. The method of claim 9, wherein the one or more session keys comprise a pairwise transit key.

13. The method of claim 9, wherein the one or more session keys comprise a group temporal key.

14. The method of claim 9, wherein the providing step further comprises installing the one or more session keys on a wireless local area network card.

15. The method of claim 14, further comprising expiring the one or more session keys when the established connection with the access point is terminated.

16. The method of claim 15, wherein the expiring step further comprises uninstalling the one or more session keys from the wireless local area network card.

17. The method of claim 9, further comprising implementing a timer in accordance with the IEEE 802.11i communication standard.

18. The method of claim 9, further comprising performing authentication in accordance with an IEEE 802 communication standard.

19. The method of claim 9, further comprising storing in a data storage area on the wireless communication device one or more profiles for secure communications over the radio interface.

* * * * *